United States Patent

Yamanaka

[15] 3,672,278
[45] June 27, 1972

[54] CONTINUOUS PHOTOGRAPHING SYSTEM IN A ROLL FILM CAMERA

[72] Inventor: Akira Yamanaka, Sakai, Japan

[73] Assignee: Minolta Camera Kabushiki Kaisha, Minami-ku, Osaka, Japan

[22] Filed: June 23, 1970

[21] Appl. No.: 49,015

[30] Foreign Application Priority Data

July 2, 1969 Japan....................................44/51745

[52] U.S. Cl..........................95/31 FM, 95/31 AC, 95/31 FL
[51] Int. Cl. ..........................................................G03b 19/04
[58] Field of Search................95/31 R, 31 FM, 31 AC, 31 FL

[56] References Cited

UNITED STATES PATENTS

| 3,237,542 | 3/1966 | Ataka | 95/31 R |
| 3,253,526 | 5/1966 | Steisslinger | 95/31 R |
| 3,232,196 | 2/1966 | Sapp | 95/34 X |
| 3,148,605 | 9/1964 | Peterson | 95/34 X |

*Primary Examiner*—Samuel S. Matthews
*Assistant Examiner*—Monroe H. Hayes
*Attorney*—Watson, Cole, Grindle & Watson

[57] ABSTRACT

A continuous photographing system in a roll film camera in which, simultaneous with shutter release a film is automatically wound up by a single picture frame length and the shutter is charged to stop automatically, by means of a built-in driving source within the camera.

3 Claims, 11 Drawing Figures

INVENTOR
Akira Yamanaka

INVENTOR
Akira Yamanaka
BY
Watson, Cole, Grindle & Watson
ATTORNEY

CONTINUOUS PHOTOGRAPHING SYSTEM IN A ROLL FILM CAMERA

BACKGROUND OF THE INVENTION

In the prior art continuous photographing systems, winding up of the film by means of a driving source is stopped by means of a driving stop member automatically operated depending on whether it has effected the automatic drive for winding up a film and charging the shutter. However, the operation release of such driving stop member is effected by the stroke of the release operation member in the shutter release operation. Therefore, it is difficult to maintain a in constant the timely adjusting between the shutter release and the operation release of the driving stop member by means of the speed of the release operation heretofore used.

SUMMARY OF THE INVENTION

In order to avoid such a drawback, the present invention provides a set gear, which is partially toothed, meshed in with a driving gear driven by a driving source, a driving stop member provided with such a partially toothed gear and a cam face and a turning piece having the tendency to return to a given direction by means of a return spring supported in a body by one and the same pin. And, after said turning piece drives the shutter opening/closing member through the returning tendency of the return spring in the release operation under the condition that the set gear is out of the mesh with the driving gear at the toothless portion thereof, the cam face of said driving stop release member operates the stop release of the driving stop member and, by the turn of said turning piece effected by the driving source under the condition that the driving gear meshes with the set gear, a film determining member is pressed in contact with a film carried by the driving source. Also, by the engagement of said film determining member and the perforation of the film, said film determining member operates the driving stop member to stop the drive given by the driving source.

The primary object of the present invention is to provide a continuous photographing system in a roll film camera in which, after the opening/closing operation of the shutter opening/closing member is finished the stop release of the driving stop member is effected.

Another object of the present invention is to provide a continuous photographing system in a roll film camera in which, regardless of the release operation, the operation of the shutter opening/closing member, the taking up of film at regular time intervals, and the shutter charge and the stopping of taking up film are carried out automatically by a driving source.

A further object of the present invention is to provide a continuous photographing system in a roll film camera in which a set gear, meshed with a driving gear driven by a driving source, is a partially toothed gear, and the operation of the shutter opening/closing member and the operation and its release of the driving stop member are effected by a driving stop release member provided with a cam face formed coaxially in a body with said partially toothed gear, and a turning member having the returning tendency to one direction through the return spring.

A still further object of the present invention is to provide a continuous photographing system in a roll film camera in which the mesh of the driving gear and the set gear, composed of a partially toothed gear, is strictly secured.

Other objects of the present invention will become apparent from the following detailed description of the invention when considered in conjunction with the accompanying drawings.

BRIEF DESCRIPTION OF THE DRAWINGS

FIGS. from 4 to 9 are respectively illustrations, showing the manner of taking up a film and stopping it, and the operation of the shutter charge in the embodiment shown in FIG. 1, wherein.

Figure 1:
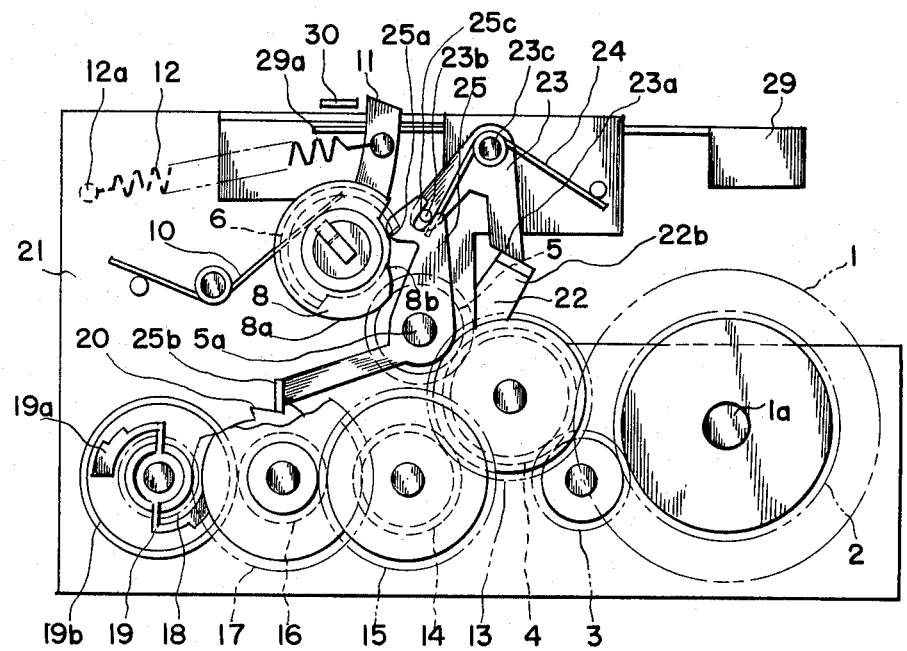
FIG. 1 is a plan view showing the formation of the upper side of such camera base plate at the time as the shutter charge is finished in a continuous photographing system in a roll film camera in accordance with the present invention.
Figure 10:
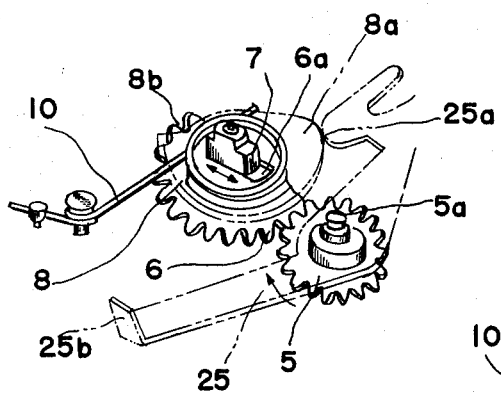
FIG. 10 is a perspective view showing the mesh condition between the set gear and the driving gear.
Figure 11:
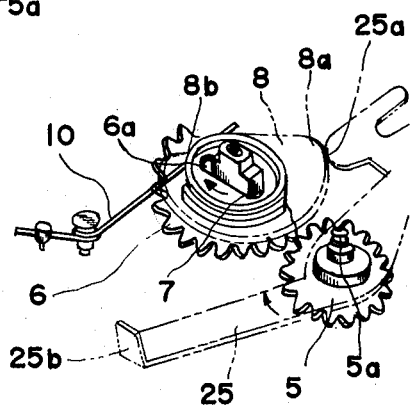
FIG. 11 is a perspective view showing the mesh condition between the set gear and the driving gear is released.

With reference to the embodiment shown in the drawings, in accordance with the present invention, a camera gear 2 on the upper side of base plate 21 is provided for driving axle 1a which is driven by drive source 1 such as an elastic turning force of a spring camera gear 2 is interlocked with governor gear 18 through a gear train of gears 3, 4, 13, 14, 15, 16, 17, as shown in FIG. 1. Governor gear 18 maintains the turning speed of driving axle 1a constant by means of a governor mechanism composed of a well known dead weight 19a and friction barrel 19b, gear 16 being integral with a gear train ratchet wheel 20. A driving gear 5 is meshed with gear 4 of the gear train and is connected by a pin to base plate 21 the set gear meshed with driving gear 5 comprising a partially toothed gear 6 which is movably supported movably in a radial direction of driving gear, 5 relative to its axle 7 by means of its slot 6a and is pressed in the direction of meshing engagement with driving gear 5 by means of a spring 10, as shown FIGS. 10 and 11.

Figure 2:
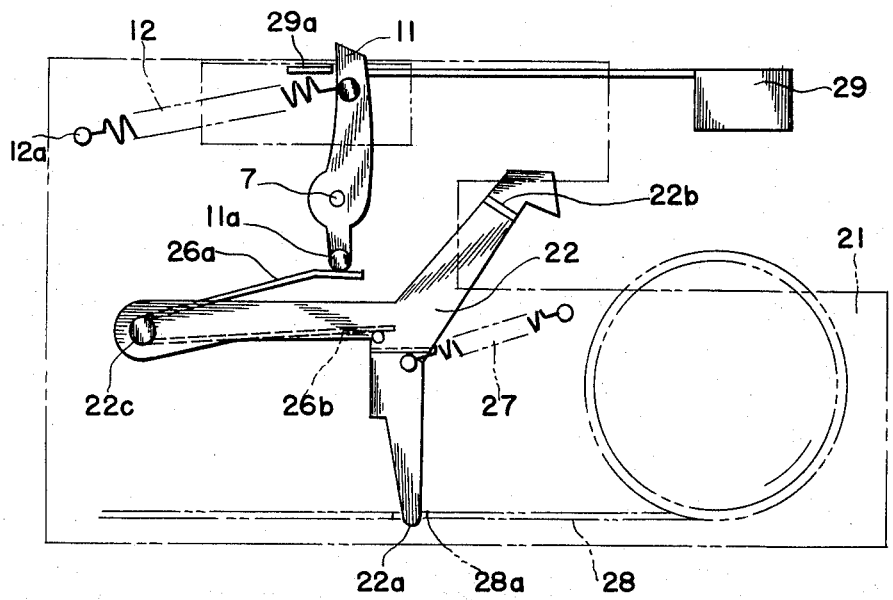
FIG. 2 is a plan view showing the lower side of the camera base plate of the embodiment shown in FIG. 1.
Figure 3:
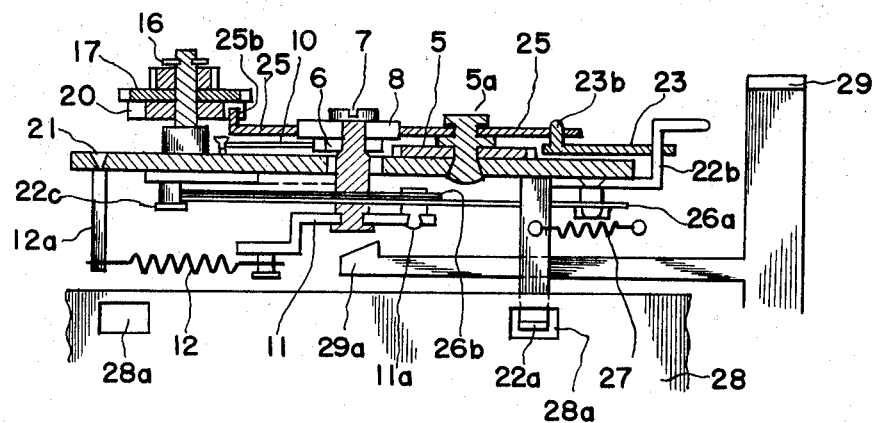
FIG. 3 is a front view in a longitudinal section of the embodiment shown in FIG. 1.
Figure 4:
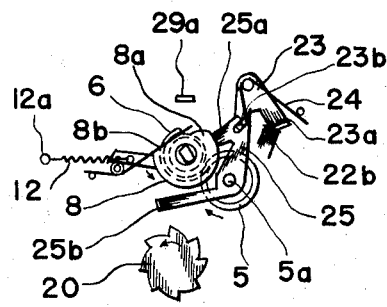
FIG. 4 shows mainly the arrangement on the upper side of the base plate at the time of shutter release.
Figure 5:
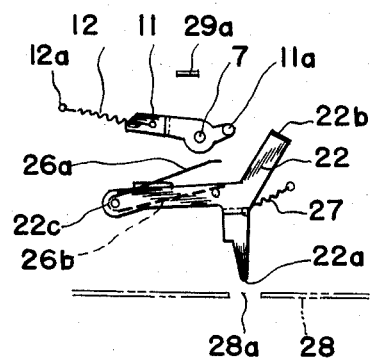
FIG. 5 shows the arrangement of the lower side of the base plate at the time of shutter release.
Figure 7:
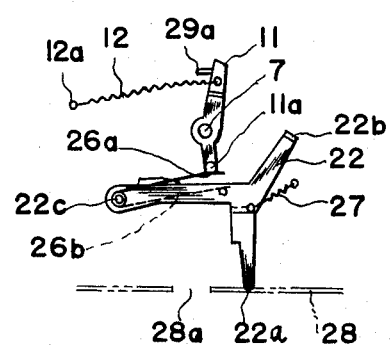
FIG. 7 shows the arrangement on the lower side of the base plate at a time just before the winding film stop and the shutter charge are finished.

As shown in FIG. 3, a turning piece 11 and a cam 8, serving as a driving stop release member, are affixed coaxially with the partially toothed gear 6. Turning piece 11 is located on the lower side of base plate 21, as shown in FIG. 2, the arm of turning piece 11 being connected to one end of a return spring 12 the other end of which is fixed by means of a pin 12a at its other end to base plate 21. The turning piece is urged in a return direction by return spring 12 and is so arranged that the mesh between partially toothed gear 6 and driving gear 5 may commence at the position where the turning piece 11 is returned, as shown in FIG. 4 and FIG. 5. And, when the arm of turning piece 11 is turned counterclockwise through about 180° by the partially toothed gear 6 moves over the operation line of return spring 12, the partially toothed gear 6 is no longer in meshing engagement with driving gear 5 since the toothless portion thereof and the arm of turning piece 11, urged toward a return position by means of a return spring 12, engages with protrusion 29a of release member 29 to be restrained. When the turning piece arm and the protrusion 29a become disengaged by the release operation of a shutter release member 29, the arm of turning piece 11 comes into contact with a movable piece 30 of a shutter opening/closing mechanism which faces toward the returning track to rotate it. The other end of the turning piece arm is provided with a protuberant portion 11a which comes into contact with a plate spring 26a and presses it as shown in FIGS. 2 and 7. Plate spring 26a is connected by means of a pin 22c to the underside of base plate 21 and the other end 26b is fixed to a film determining member 22 which comprises a fork lever arranged to turn counter-clockwise by means of a tension spring 27. And, when said plate spring 26a is pressed it gives a clockwise turning force to determining member 22 against tension spring 27. One arm of said film determining member 22 forms a film determining arm 22a so that, when the film determining member 22 is turned clockwise after being pressed by plate spring 26a, as described above, the tip of arm 22a comes into contact with film 28. When the tip faces toward perforations 28a of film 28, the turning is further continued and the tip is engaged with the film through perforation 28a. Member 22 is also provided with a restraining arm 22b which engages or disengages with or from an arm 23a of an intermediate member 23 which is connected by means of a pin 23c to base plate 21 and is arranged to turn clockwise by means of a spring 24, responding to turning positions thereof.

A tail portion 25b of a driving film stop member 25, rotatably connected by means of pin 5a to base plate 21, engages a tooth of ratchet wheel 20 which is integrally made part of gear 16 of the gear train driven by driving source 1, the tail portion 25b and the ratchet wheel 20 tooth being in engagement in counterclockwise turning position to restrain ratchet wheel 20.

Driving stop member 25 is also provided with a protrusion 25a having a fork 25C into which is fitted a pin 23b provided on the other arm of intermediate member 23. Protrusion 25a is disposed in relation to cam 8 of the driving stop release member so as to come into contact with each other or separate from each other. Cam 8 has a large diameter portion and a small diameter portion defining a notch dent portion 8b and a protuberance 8a so that as small diameter portion faces toward driving stop member 25a during the return of turning piece 11. It should be noted that gear 5 and member 25 are mounted on a common axle 5a although some other arrangement may be effected if desired.

Figure 6:
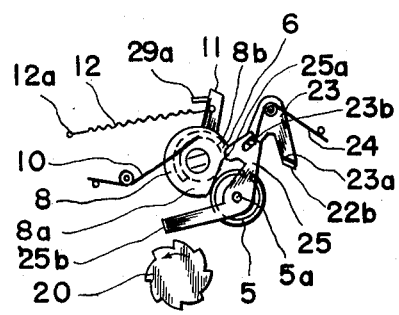
FIG. 6 shows mainly the arrangement on the upper side of the base plate at a time just before the winding film stop and the shutter charge are finished.
Figure 8:
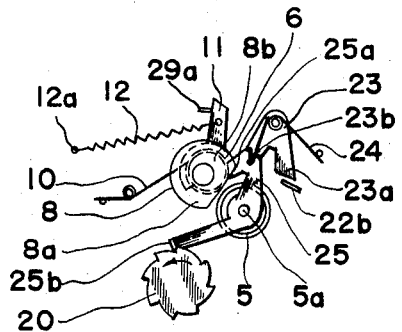
FIG. 8 shows mainly the arrangement on the upper side of the base plate at a time when the winding film stop and the shutter charge are finished.
Figure 9:
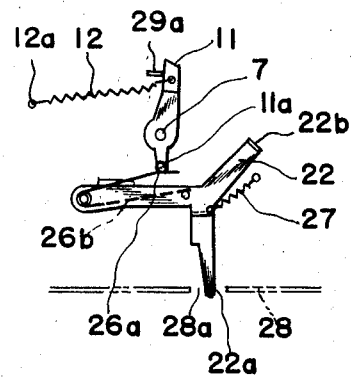
FIG. 9 shows the arrangement on the lower side of the base plate at a time when the winding film stop and the shutter charge are finished.

In describing the operation of the aforedescribed embodiment, reference is made to FIG. 4 and FIG. 5 showing the condition at release, wherein film determining member 22 is moved into a counterclockwise turning position by means of tension spring 27 so as to permit the lever of intermediate member 23 to turn counterclockwise, so that driving stop member 25 turns clockwise and protrusion 25a on the head thereof comes into contact with the large diameter portion on the cam of the driving stop release member to be held in the clockwise turning position, therefore, tail portion 25b thereof is retracted from the teeth of ratchet wheel 20 and the gear train is turned by driving source 1 to wind up film 28. At the same time, driving gear 5 is turned clockwise so as to turn partially toothed gear 6 counter-clockwise which is beginning to mesh with driving gear 5, turning piece 11 being turned counterclockwise under the force of return spring 12. With continued movement of the turning piece, i.e., away from pin 12a, the return spring becomes elongated and, upon going over the most elongated position, namely, the operation point thereof, partially toothed gear 6 is no longer in meshing engagement with driving gear 5 at the toothless portion thereof: turning piece 11 is pulled by return spring 12 to turn suddenly counterclockwise so as to engage with release member 29a to be restrained therein and thus the shutter charge is finished. In this condition, protuberant portion 11a of turning piece 11 comes into contact with plate spring 26a of film determining member 22 to depress it, so that determining member 22 is turned clockwise against tension spring 27 and determining arm 22a slides into contact with film 28 in being wound up to its condition shown in FIG. 7. Although not yet in engagement through perforation 28a of film 28 restraining arm 22b of determining member 22 is in engagement with arm 23 of lever 23 of the intermediate member so as to prevent it from turning counterclockwise so that as, shown in FIG. 6, head 25a of driving stop member 25 faces toward small diameter portion 8b of cam 8 but cannot turn counterclockwise so as to come into contact with small diameter portion 8b. Accordingly, tail portion 25b does not engage with ratchet wheel 20 so that the turning given by driving source 1 is continued and the winding up film 28 is in progress. Thus, when perforation 28a of film 28 is moved up to the position of determining arm 22a arm 22a engages the perforation, and as shown in FIG. 8, driving stop member 25 can turn counter-clockwise through intermediate member 23 and, accordingly, head 25a thereof turns to come into contact with small diameter portion 8b of cam 8, and tail portion 25b thereof engaging with ratchet wheel 20 to restrain it from turning and to stop the turning of driving source 1, and thus the winding up of the film is over.

Thereafter, upon pushing down the shutter release member 29, protrusion 29a thereof and turning member 11 are disengaged so that said turning piece 11 starts to turn counterclockwise again by being pulled by return spring 12 and kicks off movable piece 30 of the shutter opening/closing mechanism to operate it so as to effect the exposure, and goes to the release position shown in FIG. 5. Meanwhile, small diameter portion 8b of cam 8 of the driving stop release member is in contact with head 25a of driving stop member 25 so that the driving stop state is maintained. However, when the release position is passed through, large diameter portion 8a of cam 8 presses protuberance 25a of driving stop member 25 so as to turn it counterclockwise and separate tail portion 25b disengages from ratchet wheel 20 as shown in FIG. 4, therefore, so that the gear train starts to rotate by means of driving source 1. Nearly at the same time, the foremost tooth of partially toothed gear 6 meshes with driving gear 5. In this case, depending upon the relative phase relation between driving gear 5 and partially toothed gear 6, it is possible that the mesh there between is not effected smoothly resulting in what is called "half-gearing." However, in the present invention, partially toothed gear 6 is supported movably in the radial direction of driving gear 5 relative to axle 7 thereof and is pressed toward driving gear 5 by means of spring 10 so that the mesh therebetween is effected quite smoothly.

With such an arrangement and function as described above, the stop and stop release of the driving mechanism can be effected smoothly and, regardless of the shutter release operation, release is effected by means of the cam of the driving stop release member formed in a body with the turning piece urged in a return direction therefore while the shutter opening/closing mechanism is in operation the stop of driving mechanism can be effected securely, and meanwhile, it is possible to hold the film securely in a condition of rest. Also, when starting to drive again it is possible to smoothly and securely effect the mesh between the set gear composed of the partially toothed gear and the driving gear at the time the driving is started, merely by supporting the set gear movably to the radial direction of said driving gear relative to the axle of the set gear so as to press both teeth of both gears.

I claim:

1. A continuous photographing system in a roll film camera, comprising a shutter opening/closing member, a taking-up device for roll films taken up by a driving source, a film determining member connected rotatably by a pin to the camera body and provided with a determining arm for engaging with perforations of said roll film, a driving gear for interlocking with said driving source, a rotatable set gear comprising a partially toothed gear for engaging with said driving gear and for releasing said engagement, a driving stop release member mounted coaxially with said set gear and provided with a cam face, a turning piece mounted coaxially with said set gear and being urged in a return direction by means of a return spring, a shutter release member arranged to engage with said turning piece as it is being urged in its turning direction, said shutter opening/closing member being disposed in the path of the return direction and characterized in that when said turning piece is urged in its return direction to engage said shutter release member, said set gear is no longer in meshing engagement with said driving gear, said turning piece operates said shutter opening/closing member and, after the operation of said shutter opening/closing member is finished, said set gear is meshed with said driving gear and is driven by said driving source, and said film determining member, so disposed in relation to said turning piece so as to be turned thereby as said set gear is turned, is turned to thereby move its determining arm thereof into contact with the film wound up by said driving source and operate said driving stop release member by way of the engagement of said determining arm and a perforation provided on the film, and thereby the drive from said driving source is stopped.

2. A continuous photographing system in a roll film camera as set forth in claim 1, wherein a ratchet wheel is mounted coaxially with a gear provided in interlocking engagement with said driving source, said driving film stop member and said film determining member being interlocked with one another through an intermediate member, said driving film stop member, being connected rotatably by means of a pin to said camera body, coming into contact at one end thereof with said cam face of said driving stop release member with its other end being engageable and disengageable with said ratchet wheel, and said driving film stop member being controlled by said film determining member and said cam face through said intermediate member.

3. A continuous photographing system in a roll film camera as set forth in claim 1, wherein said rotatable set gear, said film stop member and said turning piece mounted coaxially with said set gear are mounted together on a rotary axle for movement in a radial direction with respect to said driving gear, in such a manner that said partially toothed gear starts to mesh with said driving gear, and said set gear being pressed against said rotary axle by means of a spring.

* * * * *